United States Patent
Smith

(10) Patent No.: US 10,793,053 B2
(45) Date of Patent: Oct. 6, 2020

(54) LOAD SECURING ASSEMBLY

(71) Applicant: Dusty Smith, Sparks, NV (US)

(72) Inventor: Dusty Smith, Sparks, NV (US)

( * ) Notice: Subject to any disclaimer, the term of this patent is extended or adjusted under 35 U.S.C. 154(b) by 97 days.

(21) Appl. No.: 16/150,710

(22) Filed: Oct. 3, 2018

(65) Prior Publication Data

US 2020/0108764 A1 Apr. 9, 2020

(51) Int. Cl.
| | |
|---|---|
| *B60P 7/08* | (2006.01) |
| *B60P 7/15* | (2006.01) |
| *B65D 90/00* | (2006.01) |
| *B61D 3/16* | (2006.01) |
| *B62D 33/04* | (2006.01) |

(52) U.S. Cl.
CPC .............. *B60P 7/15* (2013.01); *B61D 3/16* (2013.01); *B62D 33/042* (2013.01); *B65D 90/004* (2013.01); *B65D 90/0053* (2013.01); *B65D 90/0066* (2013.01); *B62D 33/046* (2013.01)

(58) Field of Classification Search
CPC ........... B60P 7/15; B62D 33/042; B61D 3/16; B65D 90/0053; B65D 90/004; B65D 90/0066
USPC .................. 410/121, 143–145, 147, 148, 150
See application file for complete search history.

(56) References Cited

U.S. PATENT DOCUMENTS

| | | | |
|---|---|---|---|
| 2,468,101 A | * | 4/1949 | Nampa ................ B61D 45/006 410/150 |
| 6,074,143 A | | 6/2000 | Langston |
| 6,722,829 B2 | | 4/2004 | Williams |
| 8,439,612 B2 | | 5/2013 | Chamoun |
| 8,979,451 B2 | | 3/2015 | Downing |
| 9,033,630 B2 | | 5/2015 | Garrigus |
| 9,475,581 B2 | | 10/2016 | Kuppan |
| 2011/0318133 A1 | * | 12/2011 | Arnold ....................... B60P 1/00 410/150 |
| 2015/0377268 A1 | | 12/2015 | Knox |

* cited by examiner

*Primary Examiner* — Stephen T Gordon

(57) ABSTRACT

A load securing assembly for securing cargo in a trailer includes a trailer that has an outer wall. A plurality of channels is provided, each of the channels is coupled to the outer wall of the trailer and each of the channels is positioned within the trailer. A plurality of locking units is provided and each of the locking units is slidably positioned in a respective one of the channels. Each of the locking units releasably engages the respective channel to retain each of the locking units at a selected point along the respective channel. Each of the locking units is positioned to abut the cargo in the trailer thereby inhibiting the cargo from moving in the trailer. Additionally, each of the locking units is positionable in a home position for storage.

8 Claims, 6 Drawing Sheets

LOAD SECURING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to securing devices and more particularly pertains to a new securing device for securing cargo in a trailer.

BRIEF SUMMARY OF THE INVENTION

An embodiment of the disclosure meets the needs presented above by generally comprising a trailer that has an outer wall. A plurality of channels is provided, each of the channels is coupled to the outer wall of the trailer and each of the channels is positioned within the trailer. A plurality of locking units is provided and each of the locking units is slidably positioned in a respective one of the channels. Each of the locking units releasably engages the respective channel to retain each of the locking units at a selected point along the respective channel. Each of the locking units is positioned to abut the cargo in the trailer thereby inhibiting the cargo from moving in the trailer. Additionally, each of the locking units is positionable in a home position for storage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
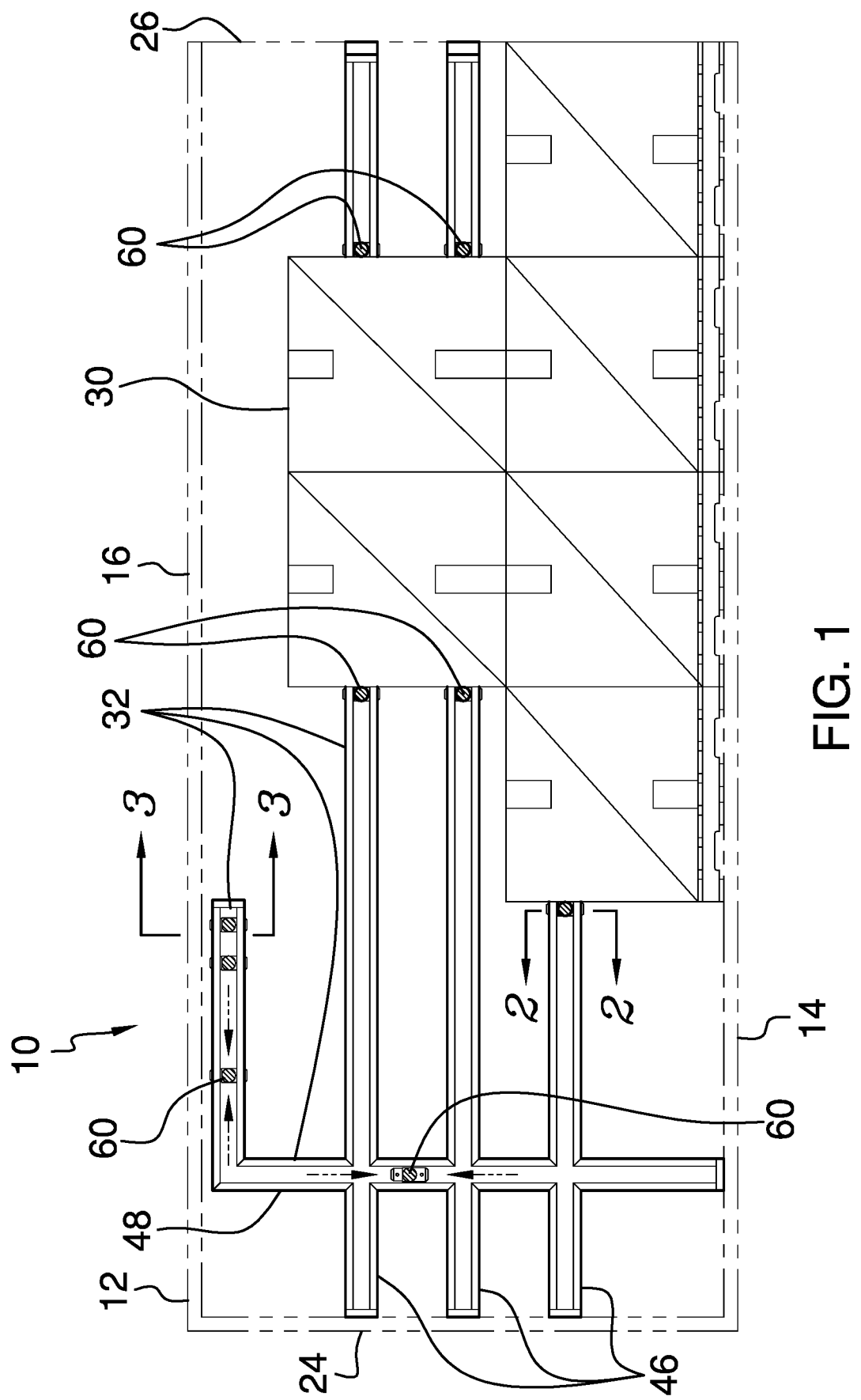
FIG. 1 is a right side cut-away view of a load securing assembly according to an embodiment of the disclosure.
Figure 3:
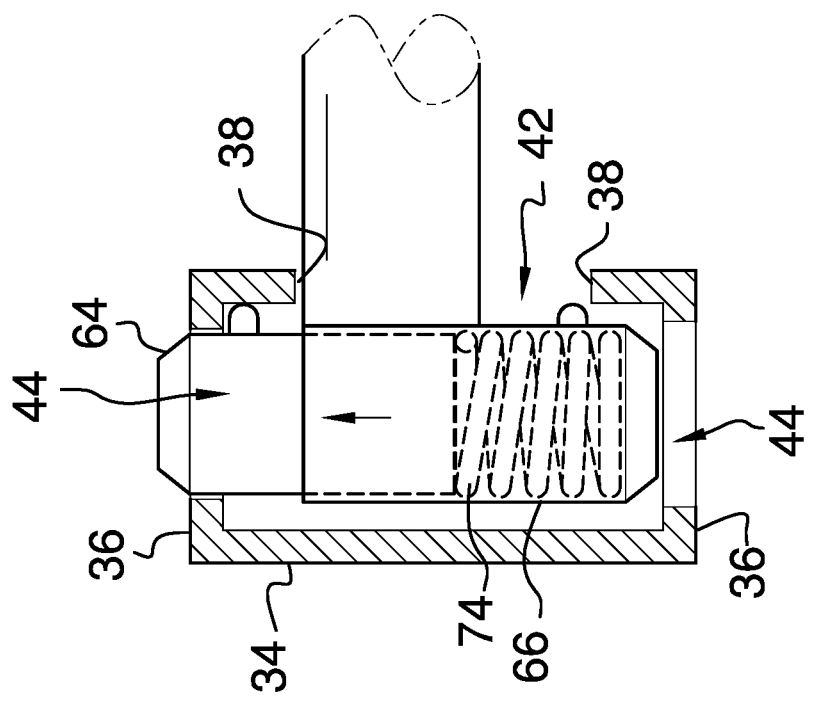
FIG. 3 is a cross sectional view taken along line 3-3 of FIG. 1 of an embodiment of the disclosure showing a locking unit disengaging a channel.
Figure 2:
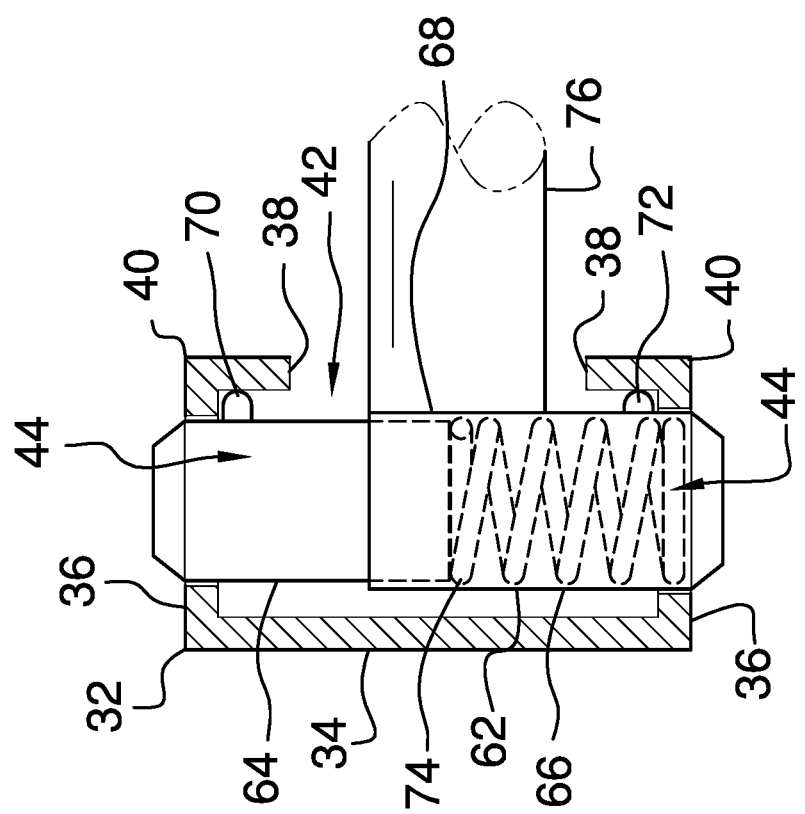
FIG. 2 is a cross sectional view taken along line 2-2 of FIG. 1 of an embodiment of the disclosure showing a locking unit engaging a channel.
Figure 4:
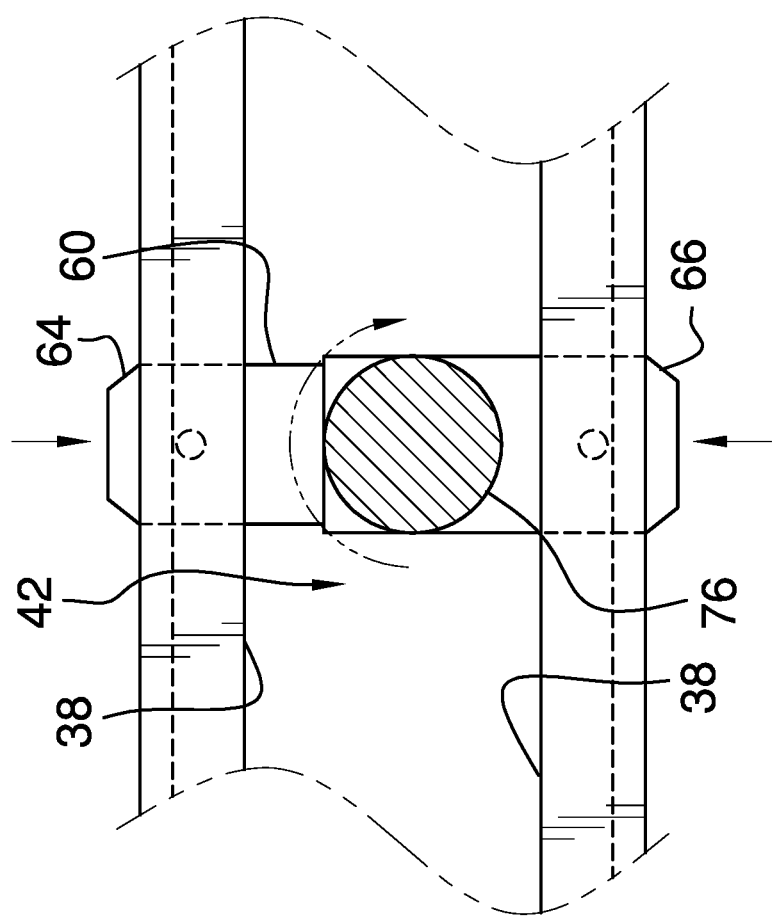
FIG. 4 is a front view of an embodiment of the disclosure.
Figure 5:
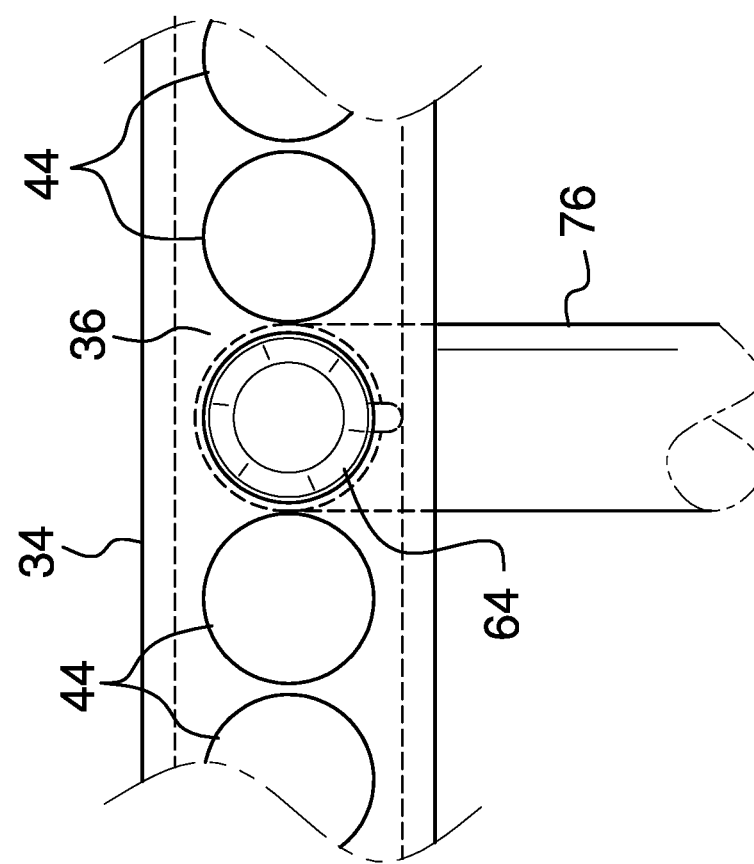
FIG. 5 is a top view of channel and a locking unit of an embodiment of the disclosure.
Figure 6:
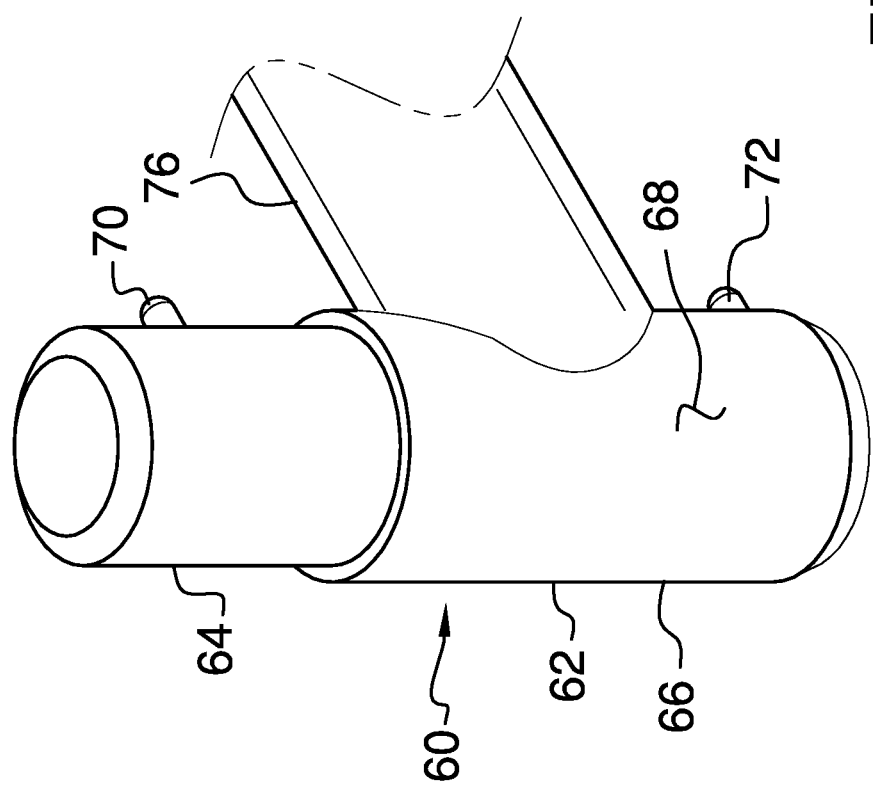
FIG. 6 is a perspective view of a locking unit of an embodiment of the disclosure.
Figure 7:
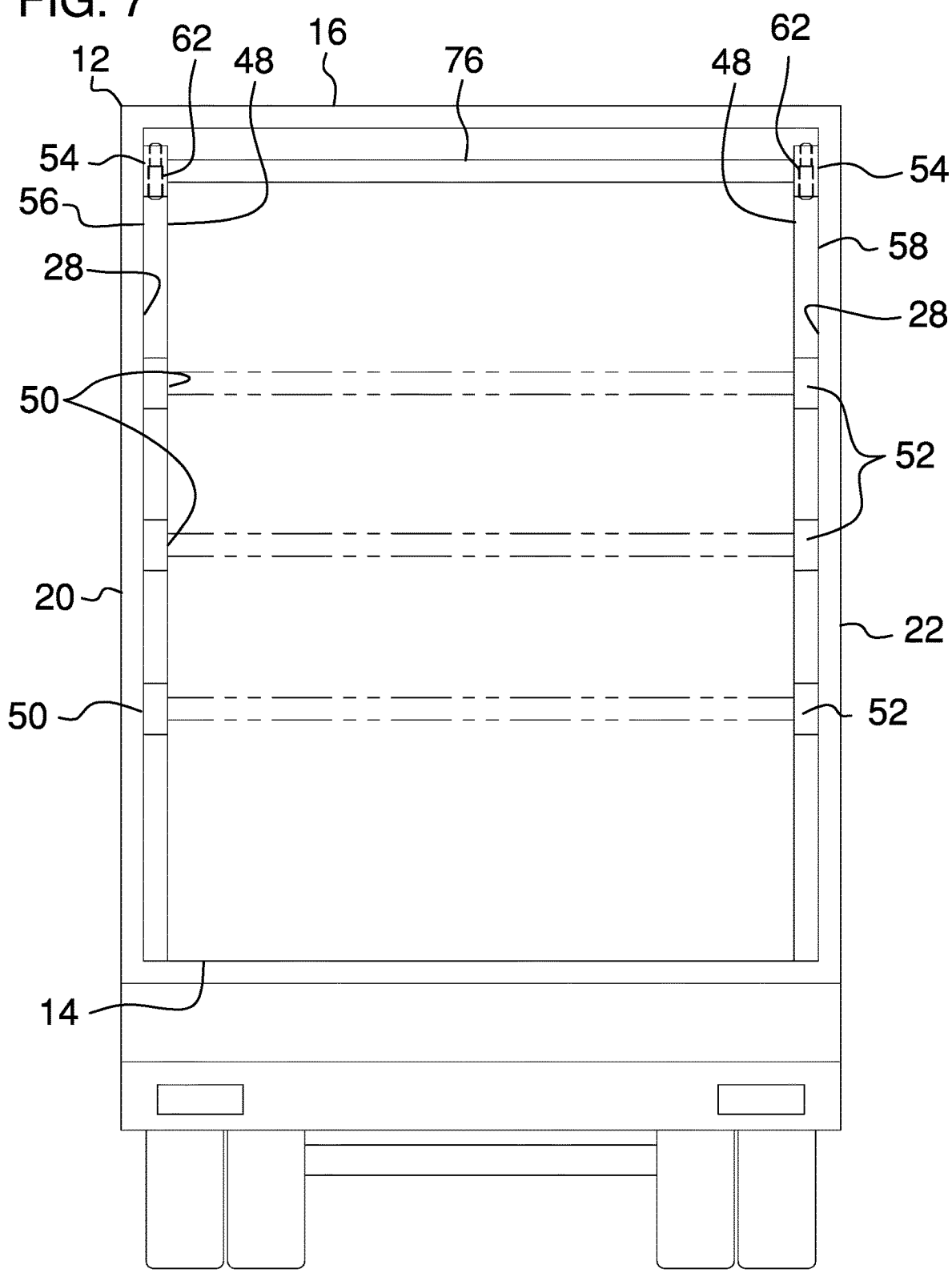
FIG. 7 is a back view of an embodiment of the disclosure.

With reference now to the drawings, and in particular to FIGS. 1 through 7 thereof, a new securing device embodying the principles and concepts of an embodiment of the disclosure and generally designated by the reference numeral 10 will be described.

As best illustrated in FIGS. 1 through 7, the load securing assembly 10 generally comprises a trailer 12 that has a floor 14, a ceiling 16 and an outer wall 18 extending therebetween. The outer wall 18 has a first lateral side 20, a second lateral side 22, a front side 24 and a back side 26. Each of the first 20 and second 22 lateral sides has an inwardly facing surface 28 and cargo 30 is positioned on the floor 14 for transporting the cargo 30. The trailer 12 may be an enclosed semi trailer, a box on a cargo truck and any other type of trailer used to transport cargo 30.

A plurality of channels 32 is included and each of the channels 32 is coupled to the outer wall 18 of the trailer 12. Each of the channels 32 is positioned within the trailer 12. Each of the channels 32 comprises a first panel 34 extending between a pair of second panels 36. The first panel 34 of each of the channels 32 is coupled to the inwardly facing surface 28 of the outer wall 18 of the trailer 12 having the second panels 36 extending toward an interior of the trailer 12. Each of the second panels 36 has a distal edge 38 with respect to the first panel 34. Moreover, each of the second panels 36 has a bend 40 thereon such that the distal edge 38 of each of the second panels 36 is directed toward each other to define a slot 42 between the distal edge 38 of each of the second panels 36. Each of the second panels 36 on each of the channels 32 has a plurality of apertures 44 extending therethrough. The apertures 44 on each of the second panels 36 are spaced apart from each other and are distributed along the second panel 36.

The plurality of channels 32 includes a plurality of horizontal channels 46 and a plurality of vertical channels 48. The plurality of horizontal channels 46 includes a set of first horizontal channels 50, a set of second horizontal channels 52 and a set of third horizontal channels 54. Each of the first horizontal channels 50 is positioned on the first lateral side 20 of the outer wall 18. Each of the second horizontal channels 52 is positioned on the second lateral side 22 of the outer wall 18. Additionally, each of the first horizontal channels 50 is aligned with a respective one of the second horizontal channels 52. Each of the first 50 and second 52 horizontal channels extends between the front side 24 and the back side 26 of the outer wall 18 of the trailer 12.

Each of the third horizontal channels 54 is aligned with the ceiling 16 of the trailer 12. The plurality of vertical channels 48 includes a first vertical channel 56 and a second vertical channel 58. The first vertical channel 56 intersects each of the first horizontal channels 50, and the second vertical channel 58 intersects each of the second horizontal channels 52. A plurality of locking units 60 is provided and each of the locking units 60 is slidably positioned in a respective one of the channels 32. Each of the locking units 60 releasably engages the respective channel 32 to retain each of the locking units 60 at a selected point along the respective channel 32. Each of the locking units 60 is positioned to abut the cargo 30 in the trailer 12 to inhibit the cargo 30 from moving in the trailer 12. Each of the locking units 60 is positionable in a home position for storage having each of the locking units 60 being positioned in the third horizontal channels 54.

Each of the locking units 60 comprises a pair of tubes 62 and each of the tubes 62 comprises a first half 64 that is slidably positioned in a second half 66. Each of the tubes 62 is slidably positionable in a respective one of the channels 32. Each of the first half 64 and the second half 66 of each of the tubes 62 engages selected ones of the apertures 44 in the second panels 36 of the respective channel 32 to retain the tubes 62 at a selected point along the respective channel 32. Each of the first half 64 and the second half 66 of each of the tubes 62 is compressible together to disengage the selected aperture 44 thereby facilitating the tubes 62 to move freely in the respective channel 32. Each of the first 64 and second 66 halves of each of the tubes 62 has an outer surface 68. A first knob 70 is coupled to the outer surface 68 of the first half 64 and the first knob 70 engages the second panel 36 through which the first half 64 extends to inhibit the first half 64 from being fully extended through the selected aperture 44. A second knob 72 is coupled to the outer surface 68 of the second half 66 and the second knob 72 engages the second panel 36 through which the second half 66 extends to inhibit the second half 66 from being fully extended through the selected aperture 44.

Each of the locking members 60 includes a biasing member 74 that is positioned within the tubes 62 and the biasing member 74 is positioned between the first half 64 and the second half 66. The biasing member 74 biases each of the first half 64 and the second half 66 away from each other to engage the selected aperture 44. A rod 76 is coupled to and extends between each of the tubes 62 such that the rod 76 extends between the first lateral side 20 and the second lateral side 22 of the trailer 12. Moreover, the rod 76 engages the cargo 30 when the locking units 60 are positioned to abut the cargo 30. The rod 76 extends between the outer surface 68 of the first half 64 each of the tubes 62.

In use, each of the locking units 60 is positioned in the pair of third horizontal channels 14 for storage. Each of the locking units 60 is urged downwardly in the first 56 and second 58 vertical channels thereby facilitating the locking units 60 to be urged into a selected pair of the first 56 and second 58 horizontal channels. The selected pair of first 56 and second 58 horizontal channels are chosen to facilitate the rod 76 of each of the locking units 60 to be positioned at a height sufficient to centrally position the rod 76 of each of the locking units 60 against the cargo 30. Additionally, the locking units 60 are positioned on opposite sides of the cargo 30 to inhibit the cargo 30 from sliding forwardly or rearwardly in the trailer 12. The locking units 60 may be arranged into any conceivable combination in the pairs of first 56 and second 58 horizontal channels to accommodate cargo 30 that has differing levels such as stacked pallets or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A load securing assembly being configured to restrain cargo in a truck trailer, said assembly comprising:
    a trailer having an outer wall, a floor, a ceiling, and said outer wall extending therebetween, said outer wall having a first lateral side, a second lateral side, a front side and a back side, each of said first and second lateral sides having an inwardly facing surface, said floor having cargo being positioned thereon for transporting the cargo;
    a plurality of channels, each of said channels being coupled to said outer wall of said trailer, each of said channels being positioned within said trailer, each of said channels comprises a first panel extending between a pair of second panels, said first panel of each of said channels being coupled to said inwardly facing surface of said outer wall of said trailer, each of said second panels extending toward an interior of said trailer, each of said second panels having a distal edge with respect to said first panel, each of said second panels has a bend thereon such that said distal edge of each of said second panels is directed toward each other to define a slot between said distal edge of each of said second panels, each of said second panels on each of said channels has a plurality of apertures extending therethrough, said apertures on each of said second panels being spaced apart from each other and being distributed along said second panel; and
    a plurality of locking units, each of said locking units being slidably positioned in a respective one of said channels, each of said locking units releasably engaging said respective channel to retain each of said locking units at a selected point along said respective channel, each of said locking units being positioned to abut the cargo in the trailer to inhibit the cargo from moving in said trailer, each of said locking units being positionable in a home position for storage, each of said locking units comprising a pair of tubes, each of said tubes comprising a first half being slidably positioned in a second half, each of said tubes being slidably positionable in a respective one of said channels.

2. The assembly according to claim 1, wherein said plurality of channels includes a plurality of horizontal channels and a plurality of vertical channels, said plurality of horizontal channels including a set of first horizontal channels, a set of second horizontal channels and a set of third horizontal channels.

3. The assembly according to claim 2, wherein each of said first horizontal channels is positioned on said first lateral side of said outer wall, each of said second horizontal channels being positioned on said second lateral side of said outer wall, each of said first horizontal channels being aligned with a respective one of said second horizontal channels, each of said first and second horizontal channels extending between said front side and said back side of said outer wall of said trailer.

4. The assembly according to claim 3, wherein said each of said third horizontal channels is aligned with said ceiling of said trailer, said plurality of vertical channels including a first vertical channel and a second vertical channel, said first vertical channel intersecting each of said first horizontal channels, said second vertical channel intersecting each of said second horizontal channels.

5. The assembly according to claim 1, wherein each of said first half and said second half of each of said tubes engages selected ones of said apertures to retain said tubes at a selected point along said respective channel.

6. The assembly according to claim 5, wherein each of said first half and said second half of each of said tubes is compressible together to disengage said selected apertures thereby facilitating said tubes to move freely in said respective channel, said second half of each of said tubes having an outer surface.

7. The assembly according to claim 6, further comprising a rod being coupled to and extending between each of said tubes such that said rod extends between said first lateral side and said second lateral side of said trailer, said rod engaging the cargo when said locking units are positioned to abut the cargo, said rod extending between said outer surface of said second half of each of said tubes.

8. A load securing assembly being configured to restrain cargo in a truck trailer, said assembly comprising:
a trailer having a floor, a ceiling, and an outer wall extending therebetween, said outer wall having a first lateral side, a second lateral side, a front side and a back side, each of said first and second lateral sides having an inwardly facing surface, said floor having cargo being positioned thereon for transporting the cargo;
a plurality of channels, each of said channels being coupled to said outer wall of said trailer, each of said channels being positioned within said trailer, each of said channels comprising a first panel extending between a pair of second panels, said first panel of each of said channels being coupled to said inwardly facing surface of said outer wall of said trailer, each of said second panels extending toward an interior of said trailer, each of said second panels having a distal edge with respect to said first panel, each of said second panels having a bend thereon such that said distal edge of each of said second panels is directed toward each other to define a slot between said distal edge of each of said second panels, each of said second panels on each of said channels having a plurality of apertures extending therethrough, said apertures on each of said second panels being spaced apart from each other and being distributed along said second panel, said plurality of channels including a plurality of horizontal channels and a plurality of vertical channels, said plurality of horizontal channels including a set of first horizontal channels, a set of second horizontal channels and a set of third horizontal channels, each of said first horizontal channels being positioned on said first lateral side of said outer wall, each of said second horizontal channels being positioned on said second lateral side of said outer wall, each of said first horizontal channels being aligned with a respective one of said second horizontal channels, each of said first and second horizontal channels extending between said front side and said back side of said outer wall of said trailer, said each of said third horizontal channels being aligned with said ceiling of said trailer, said plurality of vertical channels including a first vertical channel and a second vertical channel, said first vertical channel intersecting each of said first horizontal channels, said second vertical channel intersecting each of said second horizontal channels; and a plurality of locking units, each of said locking units being slidably positioned in a respective one of said channels, each of said locking units releasably engaging said respective channel to retain each of said locking units at a selected point along said respective channel, each of said locking units being positioned to abut the cargo in the trailer to inhibit the cargo from moving in said trailer, each of said locking units being positionable in a home position for storage, each of said locking units comprising:
a pair of tubes, each of said tubes comprising a first half being slidably positioned in a second half, each of said tubes being slidably positionable in a respective one of said channels, each of said first half and said second half of each of said tubes engaging selected ones of said apertures in said second panels of said respective channel to retain said tubes at a selected point along said respective channel, each of said first half and said second half of each of said tubes being compressible together to disengage said selected apertures thereby facilitating said tubes to move freely in said respective channel, said second half of each of said tubes having an outer surface;
a biasing member being positioned within said tube, said biasing member being positioned between said first half and said second half, said biasing member biasing each of said first half and said second half to engage said selected apertures; and
a rod being coupled to and extending between each of said tubes such that said rod extends between said first lateral side and said second lateral side of said trailer, said rod engaging the cargo when said locking units are positioned to abut the cargo, said rod extending between said outer surface of said second half of each of said tubes.

\* \* \* \* \*